June 2, 1942.  A. RAPPL  2,284,844
PARKING WINDSHIELD CLEANER
Filed Sept. 29, 1938
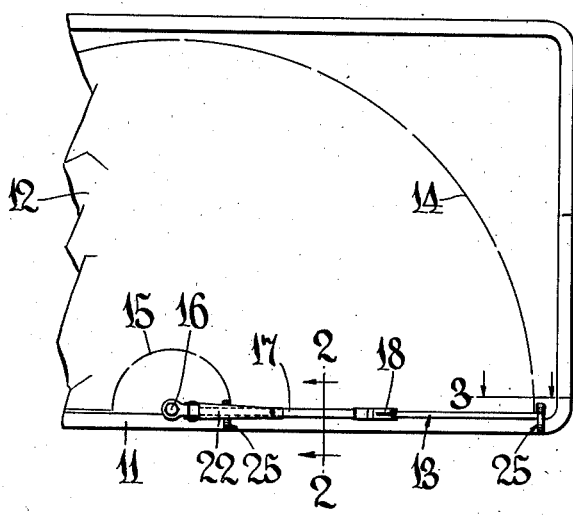
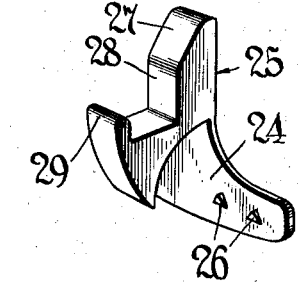
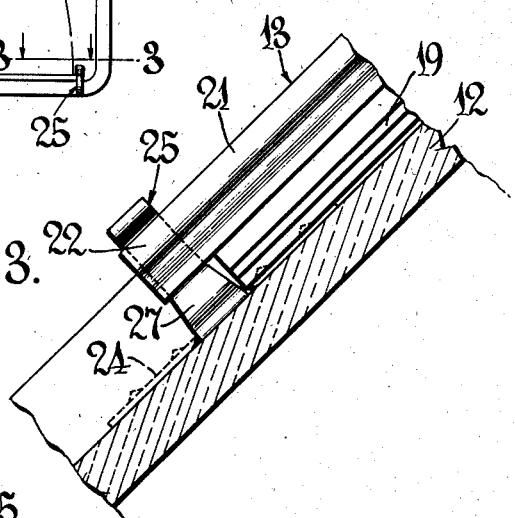
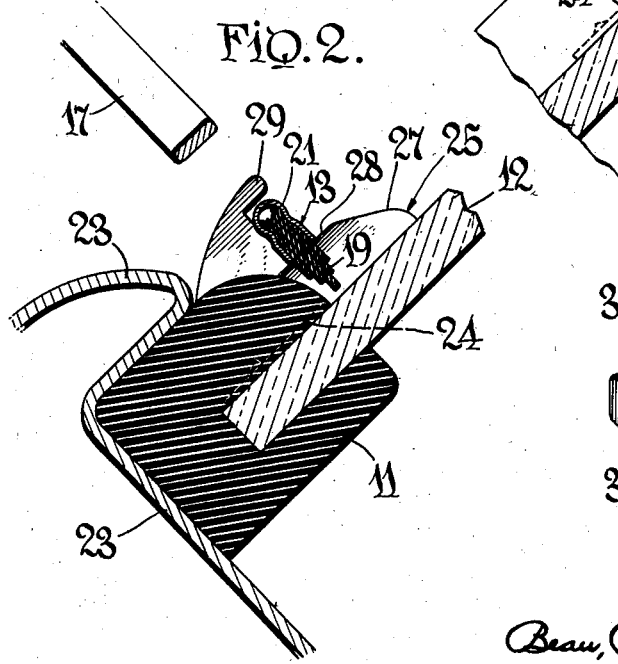
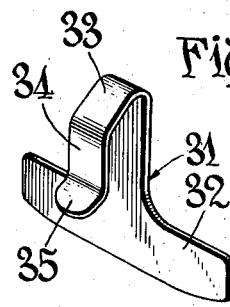
INVENTOR
Anton Rappl,
BY Beau, Brooks, Buckley & Beau.
ATTORNEYS Patented June 2, 1942

2,284,844

UNITED STATES PATENT OFFICE 2,284,844

PARKING WINDSHIELD CLEANER

Anton Rappl, Eggertsville, N. Y., assignor to Trico Products Corporation, Buffalo, N. Y.

Application September 29, 1938, Serial No. 232,399

10 Claims. (Cl. 15—255)

This invention relates to a windshield cleaner, and particularly to an improved means for parking the wiping blade of such cleaner in a manner to relieve pressure of the blade upon the glass.

In the conventional windshield cleaner, the wiping blade is detachably connected to an arm which is carried by an angularly oscillating shaft, a spring connection between the arm and shaft serving to urge the arm toward the windshield surface thereby maintaining wiping pressure of the blade upon the windshield. When the cleaner is not in use this pressure still exists and has a harmful effect upon the wiping surface of the blade, which is usually of rubber composition.

According to the present invention, cam means are provided for engaging the substantially rigid backing of the blade when the latter is moved to a terminal or parked position, to relieve the pressure from the wiping portion of the blade. At the same time the pressure upon the backing of the blade is retained so that the blade is firmly held in parked position.

These and other objects and advantages will become apparent from the following description of the typical embodiment of the invention shown in the accompanying drawing, wherein:

Fig. 1 is an elevational view of a windshield provided with a wiper means employing the invention;

Fig. 2 is an enlarged cross-section taken along line 2—2 of Fig. 1;

Fig. 3 is an enlarged plan sectional view taken along line 3—3 of Fig. 1;

Fig. 4 is an enlarged perspective view of the cam element shown in Figs. 2 and 3; and, Fig. 5 is a similar perspective view of a modified form of cam element.

As shown in Fig. 1 a molding 11 extends around the windshield glass 12, and a windshield cleaner mounted adjacent the glass has a blade 13 which wipes over the glass in an arcuate path, indicated by lines 14, 15, to or from the parked position shown in Fig. 1 wherein the blade is adjacent the molding 11 at the lower edge of the glass. The cleaner may include a shaft 16 and an arm 17 connecting the shaft to the blade, suitable means being provided whereby the arm presses the blade against the glass with sufficient force for proper wiping action. Preferably the connection 18 between the arm and blade is detachable so that a blade may be removed or replaced easily when desired.

According to the present invention the wiper blade 13 comprises one or more plies of rubber, or a like flexible wiping element, indicated at 19, for wiping engagement with the glass, and a backing element 21. The latter is substantially rigid for supporting the wiping element throughout its length for wiping contact with the glass, and may comprise a strip of metal in the form of a channel, as appears clearly in Fig. 2.

The end portions 22 of backing element 21 project beyond the ends of the wiping portion of element 19, constituting bearings for supporting the blade in parked position.

Molding 11 may comprise a channel section of rubber or other flexible material receiving the edges of glass 12, and supported upon the adjacent framework 23 of the vehicle or other supporting structure. Inserted and held between molding and glass are the flanges 24 of cam elements 25, one of which is shown in Fig. 4. If desired, the flanges may be provided with tines 26 or other roughened surface portions for better adhesion to the molding.

One cam element 25 is disposed adjacent each end of the wiper blade 13 when the latter is in parked position, and each element 25 has a cam surface 27 and a seating surface 28 for engagement by the adjacent bearing portions 22 of the blade, the bearing portions riding upon the cam surfaces onto the seating surfaces as the blade approaches parked position. When the bearings 22 are upon the seating surfaces the edge of wiping element 19 is spaced from the glass, as shown in Figs. 2 and 3. If desired, each cam element may have a finger 29 overhanging the seating surface 28 and forming a recess in the element for receiving one of the bearing portions 22, preventing displacement of the blade outwardly away from the windshield by a strong wind.

In normal operation of the windshield cleaner the wiper blade will be moved back and forth over the windshield along the arcuate path indicated by lines 14 and 15, but its motion will normally be reversed before bearings 22 engage cam surfaces 27. When the wiper blade is parked, its motion toward the molding 11 is continued until the bearings 22 ride upon the cam surfaces onto the seating surfaces 28. In this position the blade will be held quite firmly by the pressure of the wiper arm 17, but there will not be the pressure of the wiping element 19 upon the glass when the cleaner is inoperative, which in conventional wipers causes deformation and deterioration of the wiping element.

If desired the cam elements may be formed from a single sheet of material, such as steel. Such structure is illustrated in Fig. 5 wherein a sheet metal stamping 31 forms a flange 32 for insertion between the glass 12 and molding 11, and a cam portion 33 and a seating portion 34 for engagement by a bearing portion of the blade. A lip 35 at the end of the seating portion may be provided to prevent the blade from moving entirely over the cam element.

While the devices illustrated are so proportioned that the wiping portion of the blade is bodily removed from the glass when in parking position, it will be understood that the parts may be so proportioned that the blade will remain in contact with the glass, the cam means serving to reduce greatly the pressure of contact so that deformation of the wiping surface by reason of continued application of wiping pressure during periods when the cleaner is inactive is avoided. It will be understood further that the devices illustrated and described are merely illustrative of the inventive principles involved, which may be embodied in other physical formations without departing from the spirit of the invention or the scope of the appended claims.

I claim:

1. In combination with a windshield, a wiper shaft, a wiper blade and an arm carrying the blade and connecting the latter to the shaft, said arm comprising spring means reacting between the shaft and blade to press the latter toward the surface of the windshield, said blade having a portion for engaging the windshield and a cam engaging part which does not engage the windshield, and a cam engageable by said part when the blade is moved to a terminal position to relieve the pressure of said portion of the blade against the windshield.

2. In combination with a windshield, a wiper shaft, a wiper blade and an arm carrying the blade and connecting the latter to the shaft, said arm comprising spring means reacting between the shaft and blade to press the blade toward the surface of the windshield, said blade having a portion for engaging the windshield and a lifting part which does not engage the windshield, and means engageable by said lifting part when the blade is moved to a terminal position to lift said portion of the blade from the windshield.

3. In combination with a windshield glass and a molding adjacent one edge thereof, and a cam for engagement by a wiper blade when the latter is moved into adjacency with said edge, said cam having a flange extending between the glass and molding.

4. In combination with a windshield glass and a flexible molding adjacent one edge thereof, and a cam for engagement by a wiper blade when the latter is moved into adjacency with said edge, said cam having a flange extending between the glass and molding, and the surface of said flange in contact with the molding being provided with tines for biting into the molding to retain the cam engaged therewith.

5. In combination with a windshield, a wiper shaft, a wiper blade and an arm carrying the blade and connecting the latter to the shaft, said arm comprising spring means reacting between the shaft and blade to press the blade toward the surface of the windshield, said blade comprising a flexible wiping element for contact with the windshield and a rigid channel member extending along the back of said element in spaced relation to the windshield, the ends of the channel member extending beyond the ends of the flexible element, and two cams disposed adjacent an edge of the windshield, each cam being at a terminal point in the path of movement of one end of the channel member, being engageable by the latter to move the blade away from the windshield when the wiper blade is moved to a terminal position.

6. In combination with a windshield, a wiper shaft, a wiper blade and an arm carrying the blade and connecting the latter to the shaft, said arm comprising spring means reacting between the shaft and blade to press the blade toward the surface of the windshield, said blade comprising a flexible wiping element for contact with the windshield and a substantially rigid holder extending along the back of said element in spaced relation to the windshield, and cam means engageable by said holder when the blade is moved to a terminal position for lifting the flexible wiping element from contact with the windshield.

7. In combination with a windshield, a wiper shaft, a wiper arm, resilient means connecting the shaft and arm whereby the arm may move with the shaft and is pressed toward the surface of the windshield, a wiper blade carried by the arm and comprising a wiping element for contacting the windshield and a backing member therefor spaced from the windshield, and cam means engageable by said backing member when the latter is moved to a terminal position for lifting the wiping element from the surface of the windshield, the resilient means causing the backing member to be pressed against said cam means by the arm.

8. In combination with a windshield, a wiper shaft, a wiper arm, resilient means connecting the shaft and arm whereby the arm may move with the shaft and is pressed toward the surface of the windshield, a wiper blade carried by the arm and comprising a wiping element for contacting the windshield and a backing member therefor spaced from the windshield, and cam means engageable by said backing member when the latter is moved to a terminal position for relieving the pressure of the wiping element upon the surface of the windshield.

9. A windshield wiper blade comprising a wiper portion adapted to engage a windshield surface and a backing portion extending along the outer edge of the wiper portion and which is adapted to be spaced from the windshield surface when the wiper portion is in contact with said surface, said backing portion having means intermediate its ends for connection to a spring wiper arm for carrying the blade with the wiper portion thereof in contact with the windshield surface, and said backing portion including portions adjacent its ends so spaced outwardly from the wiping edge of the wiper portion as to be spaced from the windshield surface when the wiper portion is pressed by such a spring wiper arm into normal wiping contact with said surface, said end portions being cam engaging portions adapted for engagement with means adjacent the windshield to move the blade from wiping contact with the windshield surface.

10. A windshield wiper parking device for attachment to a windshield glass having a molding adjacent one edge thereof and adapted for engagement by a wiper blade when the latter is moved into adjacency with said edge, said device comprising a wiper blade camming portion upon which the wiper blade may ride and having a shoulder for limiting the movement thereon of such wiper blade, and a thin, plate-like flange extending from the wiper blade camming portion for disposition between the glass and its molding for attaching the device to the windshield glass.

ANTON RAPPL.